(12) United States Patent
Mori (10) Patent No.: US 7,559,597 B2
(45) Date of Patent: Jul. 14, 2009

(54) VEHICLE ROOF AUTOMATIC OPENING/CLOSING DEVICE

(75) Inventor: Keiji Mori, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 277 days.

(21) Appl. No.: 11/703,077

(22) Filed: Feb. 7, 2007

(65) Prior Publication Data
US 2007/0187985 A1  Aug. 16, 2007

(30) Foreign Application Priority Data
Feb. 10, 2006 (JP) .............................. 2006-033161
Dec. 5, 2006 (JP) .............................. 2006-327690

(51) Int. Cl.
*B60J 7/16* (2006.01)

(52) U.S. Cl. .................... 296/108; 296/121; 296/107.17

(58) Field of Classification Search ................. 296/108, 296/107.01, 107.07, 107.16, 107.17, 121, 296/116
See application file for complete search history.

(56) References Cited

U.S. PATENT DOCUMENTS

| | | | | |
|---|---|---|---|---|
| 5,769,483 A * | 6/1998 | Danzl et al. ............. | 296/107.08 |
| 5,833,300 A * | 11/1998 | Russke ...................... | 296/108 |
| 5,975,620 A * | 11/1999 | Jambor et al. ............ | 296/108 |
| 6,315,349 B1 * | 11/2001 | Kinnanen .................. | 296/108 |
| 6,786,528 B2 * | 9/2004 | Guillez et al. ............ | 296/108 |
| 6,921,122 B2 * | 7/2005 | Obendiek et al. ...... | 296/107.07 |
| 7,100,963 B2 * | 9/2006 | Queveau et al. ......... | 296/108 |
| 7,134,708 B2 * | 11/2006 | Russke ..................... | 296/108 |
| 7,182,390 B2 * | 2/2007 | Neubrand ................ | 296/108 |
| 7,255,385 B2 * | 8/2007 | Queveau et al. .......... | 296/108 |
| 7,290,825 B2 * | 11/2007 | Guillez et al. ............ | 296/108 |
| 7,309,098 B2 * | 12/2007 | Neubrand ............. | 296/107.17 |
| 7,309,099 B2 * | 12/2007 | Netzel et al. ............. | 296/108 |
| 7,360,828 B2 * | 4/2008 | Queveau et al. ....... | 296/220.01 |
| 7,364,217 B2 * | 4/2008 | Obendiek et al. ......... | 296/108 |
| 7,374,226 B2 * | 5/2008 | Obendiek .................. | 296/121 |
| 2005/0269832 A1 * | 12/2005 | Queveau et al. ......... | 296/108 |

FOREIGN PATENT DOCUMENTS

| | | |
|---|---|---|
| EP | 0 835 778 | 4/1998 |
| JP | 2002-103981 | 4/2002 |
| WO | WO2004037588 | * 6/2004 |

* cited by examiner

*Primary Examiner*—Glenn Dayoan
*Assistant Examiner*—Gregory Blankenship
(74) *Attorney, Agent, or Firm*—Finnegan, Henderson, Farabow, Garrett & Dunner, LLP (57) ABSTRACT

A vehicle roof automatic opening/closing device includes a first roof panel, a second roof panel and a rear window panel, a retracting mechanism moving the first roof panel so as to overlap the second roof panel and moving the first roof panel and the second roof panel so as to further overlap the rear window panel, a lift mechanism moving those panels so as to be stored within a luggage space, the retracting mechanism including plural rotational link members provided among the first roof panel, the second roof panel and the rear window panel, the rear window panel including a protruding portion formed so as to cover one of: a side surface of the second roof panel; and both a side surface of the first roof panel and the side surface of the second roof panel, and the rotational link members supported by the protruding portion of the rear window panel.

8 Claims, 6 Drawing Sheets

VEHICLE ROOF AUTOMATIC OPENING/CLOSING DEVICE

CROSS REFERENCE TO RELATED APPLICATIONS

This application is based on and claims priority under 35 U.S.C. § 119 to Japanese Patent Application 2006-033161 filed on Feb. 10, 2006 and Japanese Patent Application 2006-327690 filed on Dec. 5, 2006, the entire content of which is incorporated herein by reference.

FIELD OF THE INVENTION

The present invention relates to a vehicle roof automatic opening/closing device.

BACKGROUND

A known vehicle roof automatic opening/closing device moves a roof, which is provided above a compartment, backward and automatically stores the moved roof within a luggage space provided at a rear portion of the vehicle. Thus, the roof of the vehicle is automatically opened by means of the vehicle roof automatic opening/closing device.

According to such vehicle roof automatic opening/closing device, when the vehicle includes a large roof, the roof is divided into two panels, a first roof panel and a second roof panel, and the first roof panel is provided at a front portion of the roof, and the second roof panel is provided at a rear portion of the roof. Such roofs are to be stored within the luggage space of the vehicle in a manner where the first roof panel is moved so as to overlap the second roof panel, and then the first roof panel and the second roof panel are moved so as to be stored within the luggage space. In this configuration, the roof panels may occupy a small area in the luggage space, and the other area of the luggage space may be effectively used.

According to the known vehicle roof automatic opening/closing device having the above mentioned configuration, each roof panel is positioned above the compartment so as to close the compartment at the same height so that an outer surface of the roof is formed evenly by the roof panels. Thus, when the first roof is moved so as to overlap the second roof, firstly the first roof panel needs to be uplifted so as to be higher than the second roof panel, and then the first roof panel being higher than the second roof panel is moved so as to overlap the second roof. In order to uplift the front roof panel, the vehicle roof automatic opening/closing device has link mechanisms.

The known vehicle roof automatic opening/closing device further includes guiding rails and sliding members. The guiding rails are attached to the front roof panel at the side of the compartment so as to extend in a front-rear direction of the vehicle, and the sliding members are attached to the link mechanisms. In this configuration, the front roof panel is attached to the link mechanism in a manner where the sliding members attached to the link mechanism engages the guiding rail so as to be slidable.

In this configuration, the front roof panel is guided by the guiding rails so as to move and overlap the rear roof panel. Thus, the known vehicle roof automatic opening/closing device includes a retracting mechanism comprised of a combination of the link mechanism and the guiding rail, and such device has been disclosed in JP2002-103981A.

According to such vehicle roof automatic opening/closing device disclosed in JP2002-103981A having the retracting mechanism, in which each sliding member slides within each guiding rail, an appropriate clearance needs to be provided between the guiding rail and the sliding member in order to obtain a smooth actuation thereof, however, such clearance may cause vibrations while the vehicle is traveling, and such vibrations may further cause noises. Because the roof is positioned just above of the passenger's head, even when the noise level is low, the passenger may be annoyed by the nose. To avoid this situation, these components need to be formed with high dimensional accuracy so that little clearance is provided between the each guiding rail and sliding member, or an additional member such as a shock absorber needs to be provided between the guiding rail and the sliding member in order to absorb the noise. In those cases, the production costs would be increased.

Further, an actuating device for actuating the retracting mechanism is attached to the front roof panel. Because the size of the actuating device including an electric motor is relatively large, such actuating device occupies a lot space within the roof, as a result, design flexibility of the vehicle may be limited.

Furthermore, electric power is supplied to the electric motor through a wire, and such wire needs to be distributed from a rear portion of the vehicle to the front roof panel. Thus, a long wire needs to be used so that a structure of the vehicle roof automatic opening/closing device becomes further complex, and production costs thereof may be increased.

In the light of the above inconveniences, a need exists to provide an inexpensive vehicle roof automatic opening/closing device in which a front roof panel is moved so as to overlap a rear roof panel smoothly and quietly, and production costs of such device is reduced.

SUMMARY OF THE INVENTION

According to an aspect of the present invention, a vehicle roof automatic opening/closing device includes a first roof panel and a second roof panel positioned above a compartment of a vehicle, the second roof panel positioned behind the first roof panel in a front-rear direction of the vehicle, a rear window panel provided at a rear portion of the compartment of the vehicle, a retracting mechanism moving the first roof panel so as to overlap the second roof panel and moving the first roof panel and the second roof panel, which are overlapped each other, so as to further overlap the rear window panel, a lift mechanism moving the first roof panel, the second roof panel and the rear window panel, which are overlapped each other, so as to be stored within a luggage space provided at a rear portion of the vehicle, the retracting mechanism including plural rotational link members provided among the first roof panel, the second roof panel and the rear window panel, the rear window panel including a protruding portion formed so as to cover one of: a side surface of the second roof panel; and both a side surface of the first roof panel and the side surface of the second roof panel, while the first roof panel and the second roof panel are positioned above the compartment, and the rotational link members supported by the protruding portion of the rear window panel.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of a vehicle roof automatic opening/closing device 10 related to the present invention will be explained in accordance with FIGS. 1 through 5.

Figure 1:
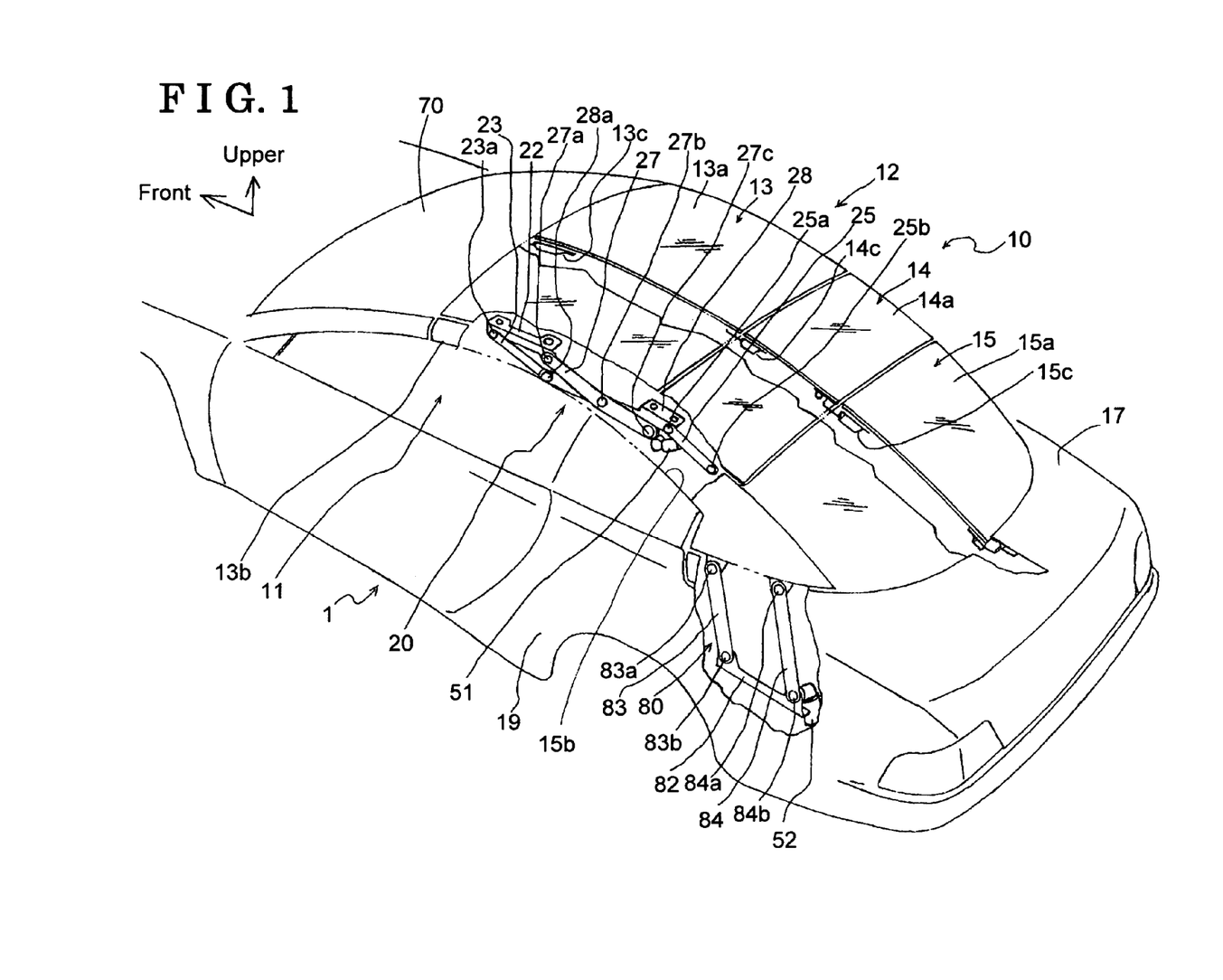
FIG. 1 illustrated an oblique perspective view of a vehicle having a vehicle roof automatic opening/closing device related to the present invention while roof panels cover a compartment of the vehicle, where a part thereof is illustrated in a cross sectional view.
Figure 2:
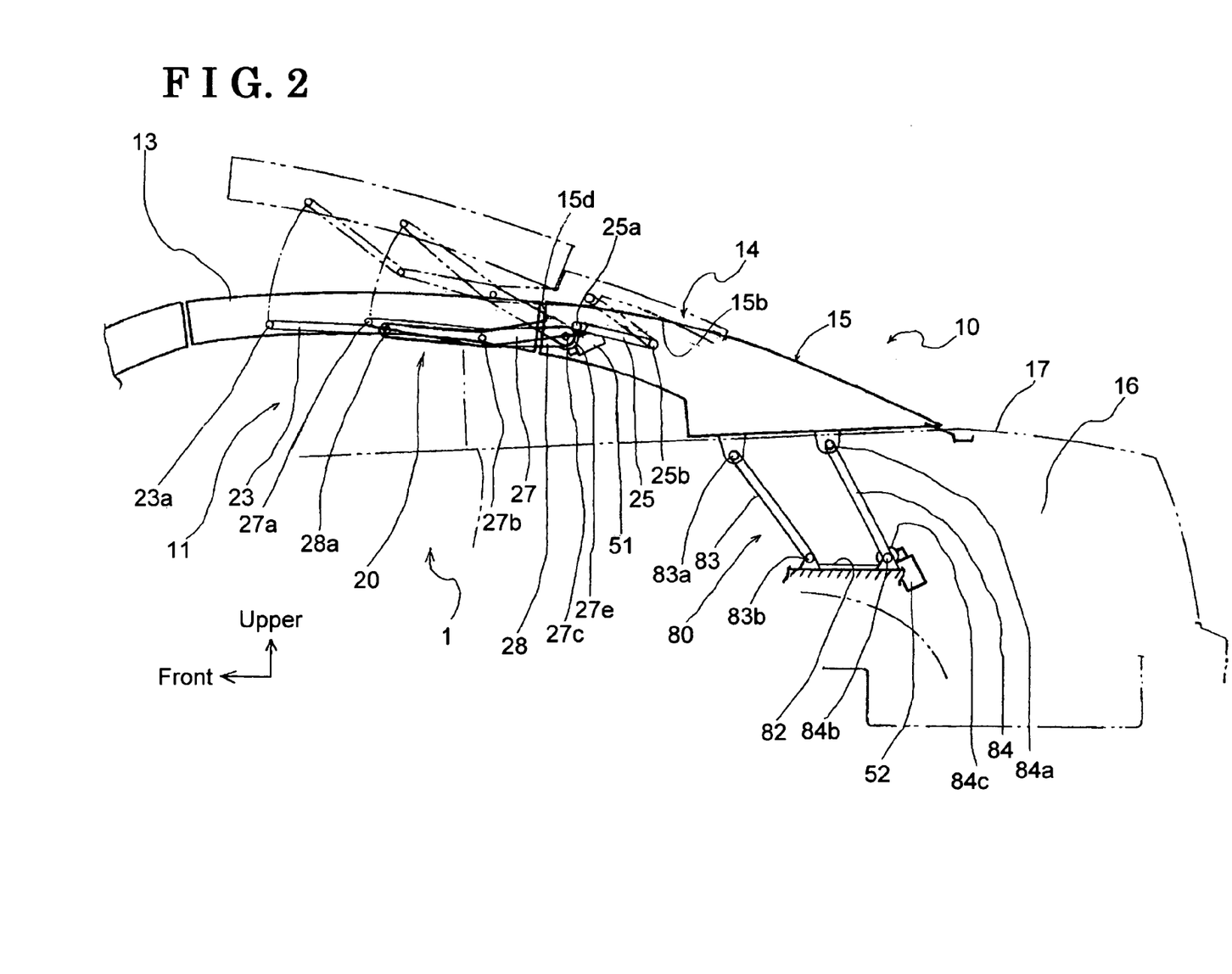
FIG. 2 illustrates a side view of the vehicle in the state illustrated in FIG. 1.

As illustrated in FIGS. 1 and 2, the vehicle roof automatic opening/closing device 10 includes a roof 12 and is attached to the vehicle in a manner where the roof 12 is provided so as to cover an upper portion of a compartment 11 of a vehicle 1. The roof 12 includes a front roof panel 12, serving as a first roof panel, and a rear roof panel 14, serving as a second roof panel. Specifically, the front roof panel 13 is provided at a front-upper portion of the vehicle, and the rear roof panel 14 is located behind the front roof panel 13. Further, a rear window panel 15 is provided at a rear portion of the compartment 11 of the vehicle 1. The rear roof panel 14 may be comprised of plural panels.

As illustrated in FIG. 1, the front roof panel 13 includes a glass panel 13a that has a semi-permeability so that sunlight can pass therethrough into the compartment 11. The front roof panel 13 may be a metal roof panel.

At an under surface of the glass panel 13a, frames 13c, serving as reinforcements, are attached. Specifically, one frame 13c is attached at the front end of the under surface of the glass panel 13a, and the other frame 13c is attached at the rear end of the under surface of the glass panel 13a.

At each right and left end of the glass panel 13a, a side supporting member 13b is attached respectively so as to function as reinforcement. By means of the side supporting member 13b, the glass panel 13a is connected to a vehicle body 19.

The rear roof panel 14 may has the same structure as of the front roof panel 13. Specifically, the rear roof panel 14 may include a glass panel 14a and frames 14c in the same manner as of the front roof panel 13, and the rear roof panel 14 may include a metal roof panel instead of the glass panel 14a.

Further, the rear window panel 15 includes a glass panel 15a, two side supporting members 15b, serving as a protruding portions, and frames 15c. One side supporting member 15b is provided at the right side of the rear widow panel 15, and the other side supporting member 15b is provided at the left side of the rear window panel 15. Each side supporting member 15b is formed so as to protrude forward.

Further, each side supporting member 15b is provided so as to cover the side surface of the rear roof panel 14. Each side supporting member 15b may be formed so as to extend toward the front roof panel 13 so as to cover both the side surface of the rear roof panel 14 and the side surface of the front roof panel 13.

The glass panel 15a of the rear window panel 15 is made of transmitting glass so that a rearward view of a driver is not interrupted by the rear window panel 15.

Further, as illustrated in FIGS. 1 and 2, two retracting mechanisms 20 are attached to both the under surface of the front roof panel 13 and the under surface of the rear roof panel 14 at the side of the compartment 11. Specifically, one retracting mechanism 20 is provided at the right side of the vehicle roof automatic opening/closing device 10 (not shown), and the other retracting mechanism 20 is provided at the left side of the vehicle roof automatic opening/closing device 10. In this embodiment, because each retracting mechanism 20 has an identical structure, only the left retracting mechanism 20 is illustrated in the drawings and will be explained below.

The retracting mechanism 20 includes plural rotating link members, and rotating link members are connected by connecting means such as pins. Specifically, the rotating link members includes a bracket 22, a drive link 27, a driven link 28, a front auxiliary link 23 serving as a first auxiliary link, and a rear auxiliary link 25 serving as a second auxiliary link. Each of those links are formed in a long shape A configuration of the retracting mechanism 20 will be explained in detail. A bracket 22 being one of the rotating link members of the retracting mechanism 20 is fixed to the front roof panel at the side of the compartment 11 thereof. At one end of the bracket 22, one end of the front auxiliary link 23 is rotatably connected by means of a pin 23a, serving as a fifth connecting member, and at the other end of the bracket 22, one end of the drive link 27 is also rotatably connected by means of a pin 27a, serving as a first connecting member.

A bearing may be provided at the front auxiliary link 23 in order to hold the pin 23a, and another bearing may be provided at the drive link 27 in order to hold the pin 27a. Those bearings may be provided at the bracket 22. An existing rotational bearing may be used as the bearing holding the pins so that the cost thereof can be reduced.

At the other end of the front auxiliary link 23, one end of the driven link 28 is rotatably connected by means of a pin 28a, serving as a third connecting member. The driven link 28 is formed and provided so as to extend toward the rear of the vehicle 1, and the other end of the driven link 28 is fixed to the rear roof panel 14. The driven link 28 is rotatably connected to the drive link 27 at a central portion thereof by means of a pin 27b, serving as a forth connecting member.

The other end of the drive link 27 is rotatably connected to the side supporting member 15b of the rear window panel 15 at the side of the compartment 11 by means of a pin 27c, serving as a second connecting member. At the other end of the driven link 28, which is fixed to the rear roof panel 14, one end of the rear auxiliary link 25 is rotatably connected by means of a pin 25a, serving as a sixth connecting member. The other end of the rear auxiliary link 25 is rotatably connected to the side supporting member 15b of the rear window panel 15 by means of a pin 25b, serving as a seventh connecting member.

In this way, the rotating link members are all supported by the side supporting member 15b in a manner where the drive link 27 and the rear auxiliary link 25 are rotatably connected by the side supporting member 15b. Thus, positions where the rotational link members are attached are secured, and the rotational link members can be firmly supported.

Although weight of the front roof panel 13 and the rear roof panel 14 are applied to the rotational link members, because the side supporting member 15b exists between the rotational link members and the rear window panel 15, the weight is not be applied to the rear window panel 15 directly.

A configuration of an actuating device 51, serving as an actuating mechanism, for actuating the retracting mechanism 20 will be explained in accordance with FIGS. 1 and 2. The actuating device 51, serving as an actuating mechanism, is attached so as to be supported by the side supporting member 15*b* of the rear window panel 15. The actuating device 51 may be attached to the rear window panel 15. The actuating device 51 includes an electric motor (not shown) and a reducer (not shown) for reducing a speed of the electric motor. Rotations outputted from the reducer are transmitted to a gear 27*e* (illustrated in FIG. 2), provided so as to be coaxial with the pin 27*c* so that the drive link 27 is rotated relative to the pin 27*c*.

A cable or the like through which electric power is supplied to the actuating device 51 passes through inside of the side supporting member 15*b* of the rear window panel 15. Inside of the side supporting member 15*b* of the rear window panel 15, many cables used for a lighting device or the like are provided, and the cable used for the actuating device 51 may be branched from one of those cables. Thus, the length of the cable for the actuating device 51 may be shortened.

As illustrated in FIGS. 1 and 2, at the lower portion of the side supporting member 15*b* of the rear window panel 15, two lift mechanisms 80 are provided. One lift mechanism 80 is provided at the right side of the vehicle roof automatic opening/closing device 10 (not shown), and the other lift mechanism 80 is provided at the left side of the vehicle roof automatic opening/closing device 10. In this embodiment, because each lift mechanism 80 has an identical structure, only the left lift mechanism 80 is illustrated in the drawings and will be explained below.

The lift mechanism 80 includes a base bracket 82 by which the lift mechanism 80 is fixed to the vehicle body 19 as illustrated in FIG. 2.

The lift mechanism 80 further includes a front lift link 83 and a rear lift link 84, and one end of the front lift link 83 is rotatably connected to the base bracket 82 by means of a pin 83*b*, and one end of the rear lift link 84 is rotatably connected to the base bracket 82 by means of a pin 84*b*. The front lift link 83 and the rear lift link 84 are formed in a long shape and provided so as to extends parallel each other upward from the base bracket 82, and the other end of the front lift link 83 is rotatably connected to the lower portion of the side supporting member 15*b* by means of a pin 83*a*, and the other end of the rear lift link 84 is rotatably connected to the lower portion of the side supporting member 15*b* by means of a pin 84*a*.

The lift mechanism 80 further includes an actuating device 52. The actuating device 52 has a configuration that is similar to the actuating device 51. Specifically, the actuating device 52 includes an electric motor (not shown) and a reducer (not shown). The rotations are outputted by the reducer to the gear 84*c* (FIG. 2) so that the rear lift link 84 is rotated relative to the pin 84*b*. In this embodiment, the rear lift link 84 is rotated by means of the actuating device 52, however, the front lift link 83 may be rotated instead of the rear lift link 84.

In this manner, once the retracting mechanisms 20 is actuated by the actuating device 51 and the lift mechanism 80 is actuated by the actuating device 52, the front roof panel 13, the rear roof panel 14 and the rear window panel 15 are moved in a manner where predetermined postures of those panels relative to the vehicle are maintained.

As illustrated in FIGS. 1 and 2, a luggage space 16 is provided at the rear portion of the vehicle 1 in a conventional manner, and such luggage space 16 is closed by a luggage door 17 as illustrated in FIG. 2. According to the vehicle roof automatic opening/closing device 10 of the present invention, the luggage door 17 is actuated so as to close/open the luggage space 16 in conjunction with the actuations of the retracting mechanism 20 and the lift mechanism 80 actuated by the aforementioned actuating devices and a controlling device.

Next, the actuation of the vehicle roof automatic opening/closing device 10 related to the present invention will be explained in accordance with FIGS. 3, 4 and 5, in addition to FIGS. 1 and 2.

As indicated with solid lines in FIGS. 1 and 2, while the compartment is closed by the front roof panel 13 and the rear roof panel 14, when the passenger operates the control device (not shown) for controlling the vehicle roof automatic opening/closing device 10 in order to open the roof of the vehicle, the actuating device 51 is actuated. Then, the retracting mechanism 20 is actuated so that the front roof panel 13 and the rear roof panel 14 are uplifted so as to be in a state indicated by a chain double dashed line in FIG. 2.

Figure 3:
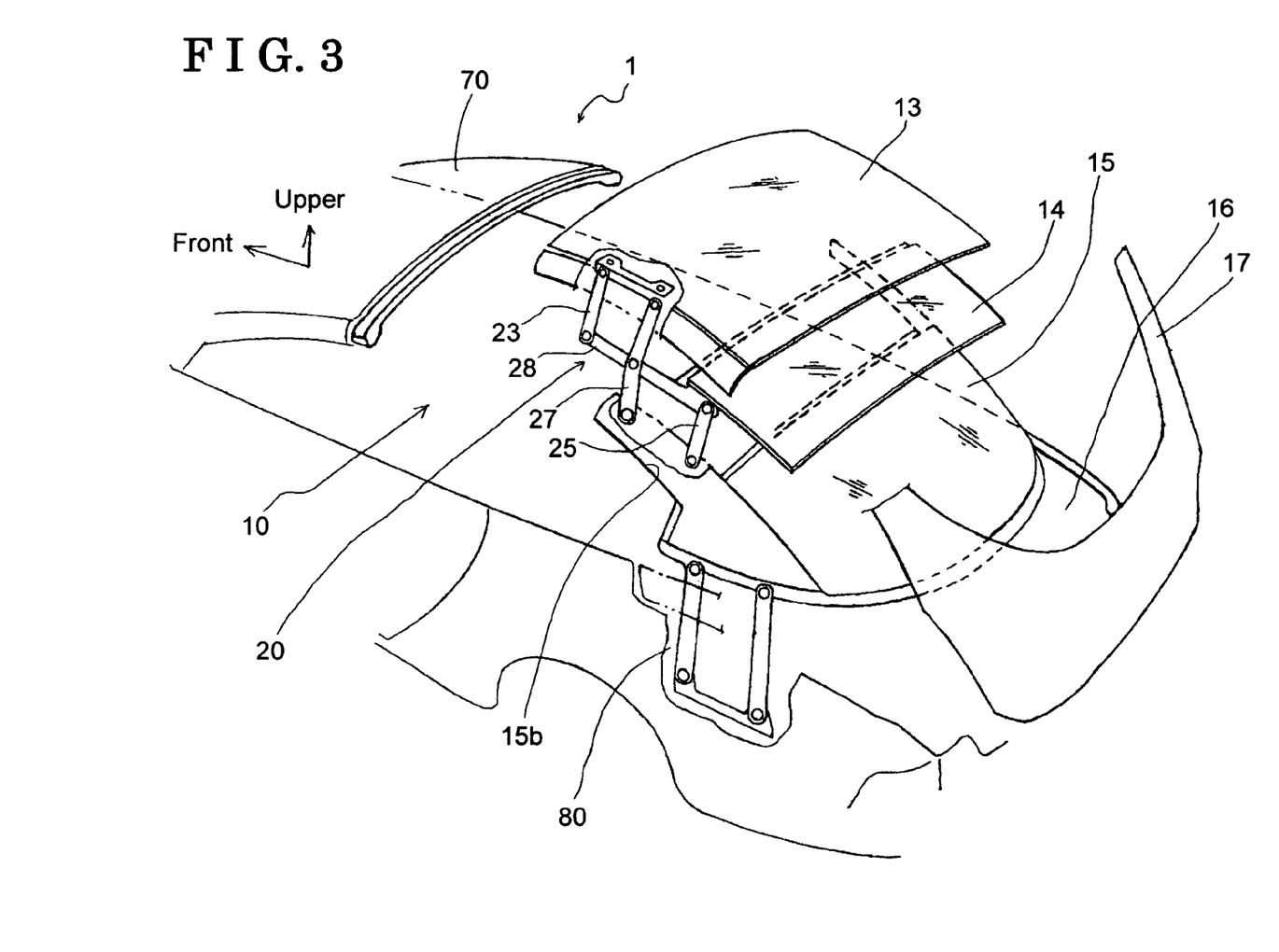
FIG. 3 illustrates an oblique perspective view of the vehicle having the vehicle roof automatic opening/closing device related to the present invention, where a front roof panel and a rear roof panel overlapping each other are moved so as to be above the rear window panel.
Figure 4:
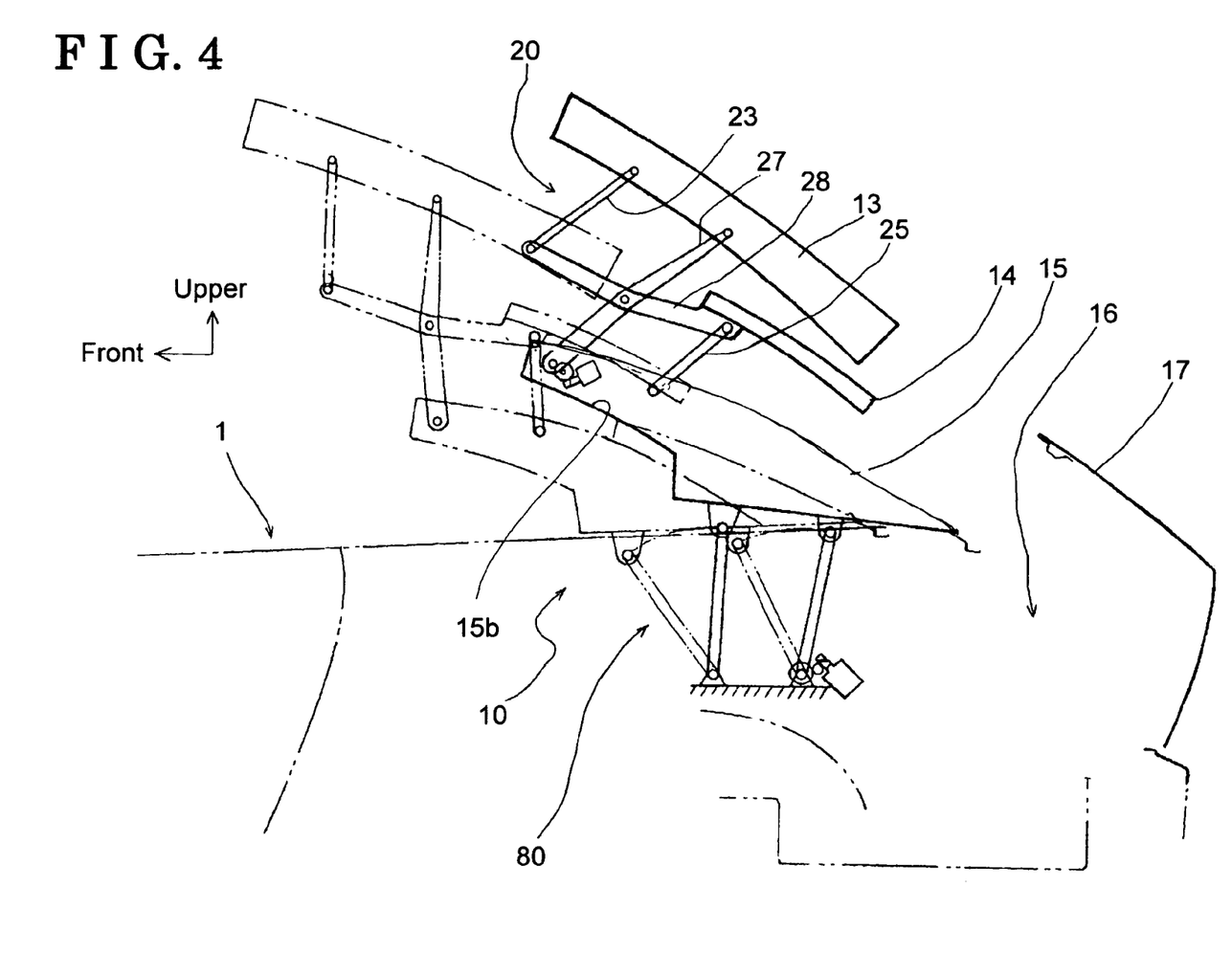
FIG. 4 illustrates a side view of the vehicle in the state illustrated in FIG. 3.
Figure 5:
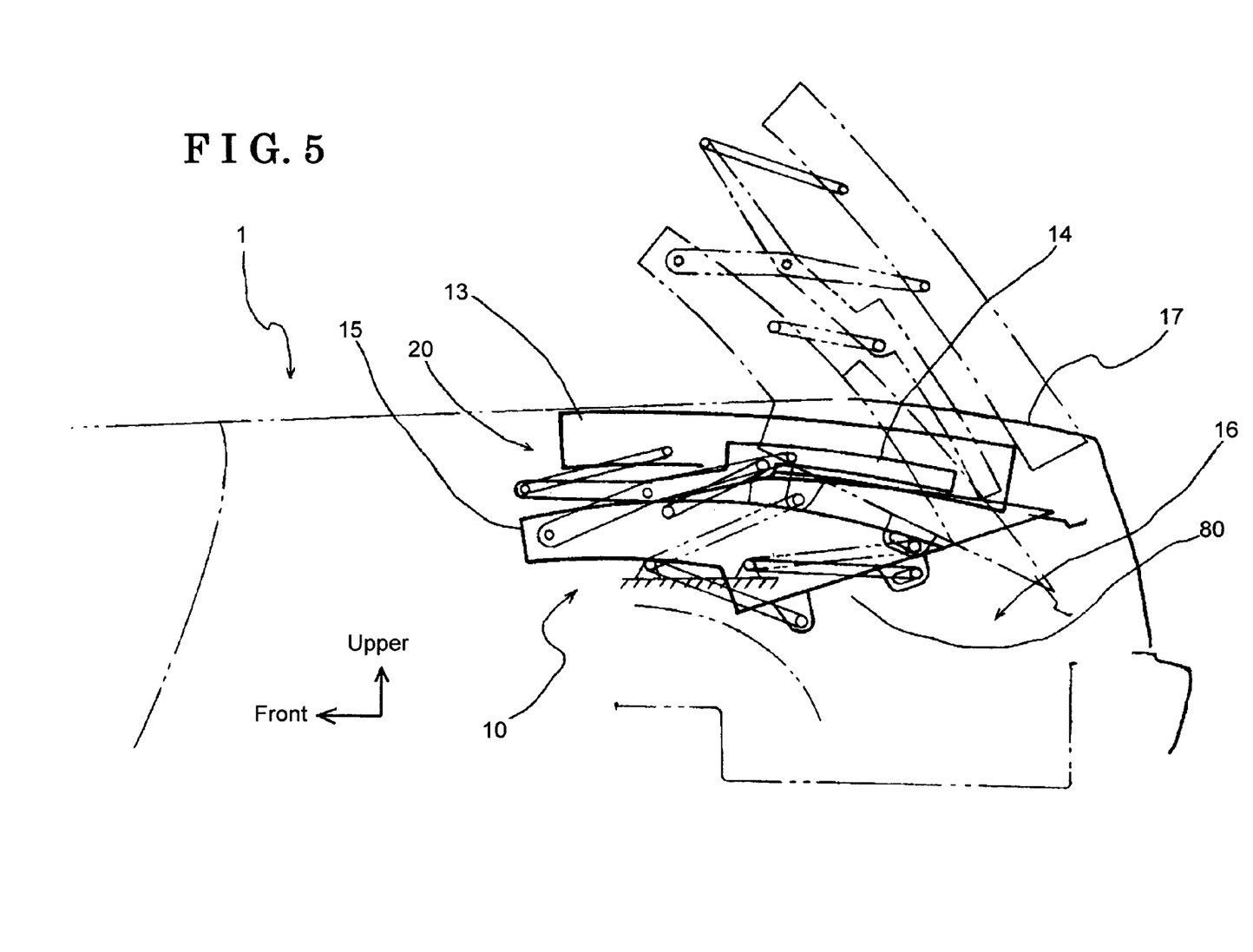
FIG. 5 illustrates a side view of the vehicle having the vehicle roof automatic opening/closing device related to the present invention, where the front roof panel, the rear roof panel and the rear window panel, which are overlapping each other, are moved so as to be stored within the luggage space.

The actuation of the roof automatic opening-closing device 10 automatically continues, and the roof automatic opening-closing device 10 becomes a state illustrated in FIGS. 3 and 4 in which the front roof panel 13 is moved so as to overlap the rear roof panel 14. Further, the rear roof panel 14 together with the front roof panel 13 is moved rearward so as to overlap the rear window panel 15. The lift mechanism 80 is also actuated in synchronized with the actuation of the retracting mechanism 20 actuated for moving the front roof panel 13 and the rear roof panel 14 in a rear direction. Specifically, once the actuating device 52 is actuated, the lift mechanism 80 positioned as indicated by a chain double dashed line in FIG. 4 is actuated so as to be in a state indicated by a solid line in FIG. 4.

Further, in synchronized with the actuation of the lift mechanism 80, the luggage door 17 is automatically opened so as to be in a state illustrated in FIGS. 3 and 4. The actuations of the retracting mechanism 20 and the lift mechanism 80 of the vehicle roof automatic opening/closing device 10 automatically continue until they become a state indicated by a solid line in FIG. 5. At this point, the front roof panel 13, the rear roof panel 14 and the rear window panel 15 are stored within the luggage space and the luggage door 17 is automatically actuated so as to close the luggage space 16. Then, the actuation of the vehicle roof automatic opening/closing device 10 is stopped.

Figure 6:
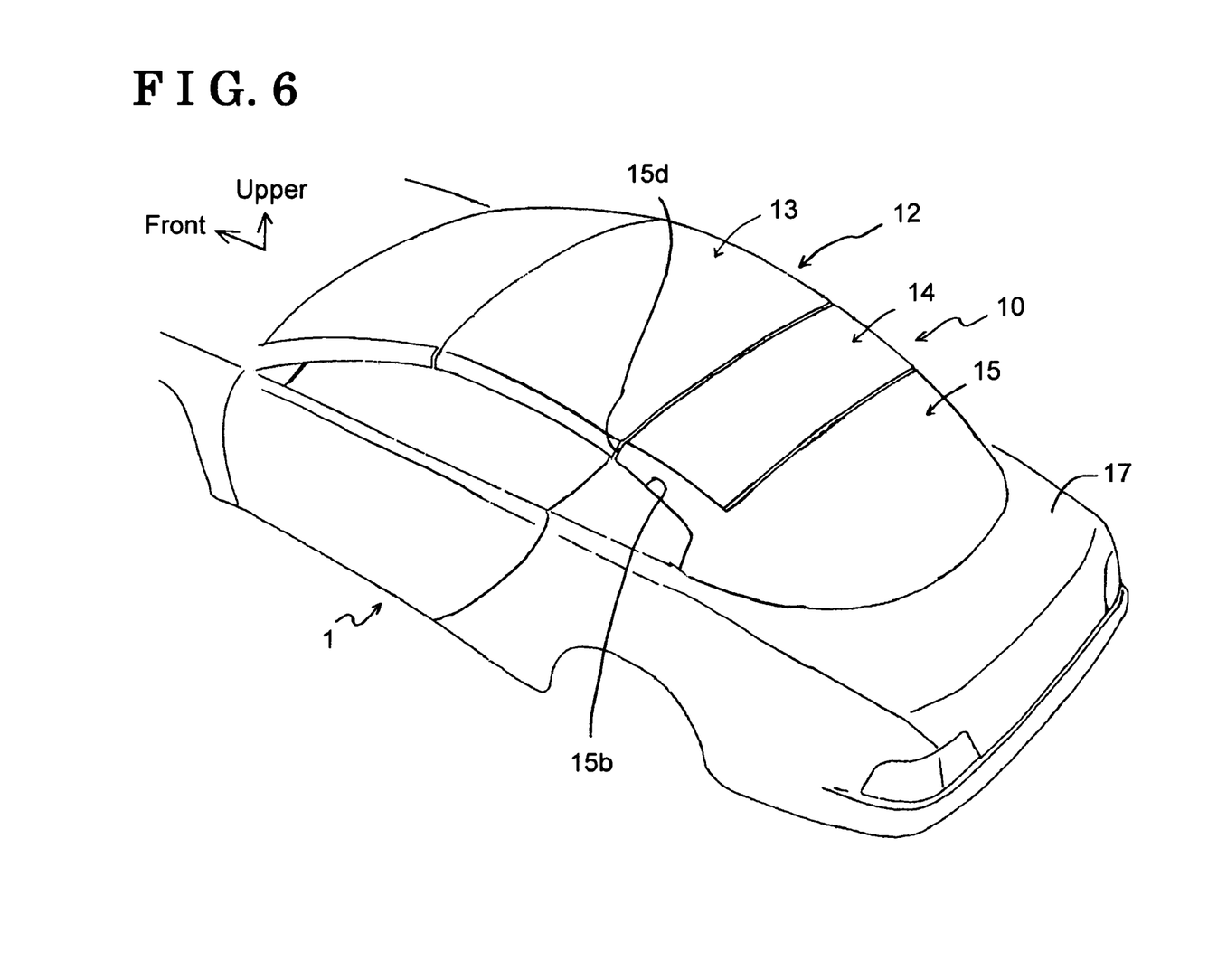
FIG. 6 illustrated an oblique perspective view of the vehicle having a vehicle roof automatic opening/closing device related to the present invention.

Further, while the roof of the vehicle 1 is opened, when the control device is operated again, the aforementioned operations are executed in reverse, and the vehicle roof automatic opening/closing device 10 is returned so as to be in a state illustrated in FIGS. 1 and 2. In this state, the compartment 11 of the vehicle is closed. In this closed state, because one of: the side surface of the rear roof panel 14; and both the side surface of the front roof panel 13 and the side surface of the rear roof panel 14, is covered by the side supporting member 15*b* of the rear window panel 15, only one break line (joint line) 15*d* of break lines existing between the front roof panel 13, the rear roof panel 14 and the rear window panel 15 (FIG. 6) is seen at side surface of the vehicle 1. That is to say, though there are plural break lines between the front roof panel 13, the rear roof panel 14, and the rear window panel 15, the break line between the rear roof panel 14 and the rear window panel 15 is covered by the side supporting member 15*b*, and the break line between the rear end portion of the front roof panel 13 and the front end portion of the rear roof panel 14 and the break line between the rear end portion of the front roof panel 13 and front end portion of the side supporting member 15*b* overlap in the side surface of the vehicle 1. Thus, appearance of the vehicle can be improved.

According to the vehicle roof automatic opening/closing device 10 related to the present invention, the retracting mechanism 20 has a simple configuration having the link mechanism without, for example, guiding rails and sliding members, which are used in the known apparatus.

Further, because the link members of the link mechanism are connected each other by means of pins, sizes of the connecting portions of each link member used precisely set, as a result, noises caused by vibrations may be reduced. Thus, the roof opening/closing operation is executed smoothly and quietly, and further, durability can be obtained.

According to the known device, a sliding member and a guiding member are provided, and a clearance is defined between them so that smooth actuation thereof can be obtained. Because of such clearance, vibrations may be caused during the vehicle is traveling, and such vibrations may cause noises. In order to avoid such situation, a shock absorber or the like needs to be provided between the sliding member and the guiding member. According to the vehicle roof automatic opening/closing device, because the first and second roof panels are rotatably connected to the rear window panel by means of the plural rotating link members, the space is not provided, as a result, the noise is not occurred. Thus, an inexpensive and accurate vehicle roof automatic opening/closing device is provided.

While the compartment of the vehicle is closed, one of: the side surface of the second roof panel; and the side surfaces of the first roof panel and the second roof panel, is covered by the protruding portion of the rear window panel. In this configuration, only one break line is seen from outside of the vehicle, the break line existing between a rear end of the first roof panel and a front end of the rear window panel, or between a rear end of a front windshield and the front end of the rear window panel. Thus, appearance of the vehicle can be improved. In this way, because the rotating link members are all supported by the protruding portion of the rear window panel, an attachment position of the all rotational link members is secured, and the rotational link members can be firmly supported. Although weight of the first roof panel and the second roof panel are applied to the rotational link members, because the protruding portion is provided between the rotational link members and the rear window panel, the weight is not be applied to the rear window panel directly. Thus, the roof opening/closing operation is executed smoothly and quietly, and further, durability can be obtained.

The first and second roof panels and the rear window panel are connected each other by means of connecting means of the retracting mechanism. The connecting means includes an existing rotational bearing, which is inexpensive and accurate. Thus, a clearance defined within the connecting means, which may cause vibrations and noises, may be reduced, and, using the existing rotation bearing, the production cost of the vehicle roof automatic opening/closing device can be reduced.

Further, because the actuating device is provided at the rear window panel, to which the device is easily attached, a design of the vehicle can be simplified. Furthermore, the actuating device is provided in the vicinity of the point at which the rotating link member is supported by the rear window panel, the actuating force from the actuating device is effectively transmitted to the rotating link member. Further, because the wire for the electric power supply is distributed from the rear of the vehicle and connected to the actuating device, the length of the wire is shortened. Thus, the production cost of the vehicle roof automatic opening/closing device can be reduced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A vehicle roof automatic opening/closing device comprising:

a first roof panel and a second roof panel positioned above a compartment of a vehicle;

the second roof panel positioned behind the first roof panel in a front-rear direction of the vehicle;

a rear window panel provided at a rear portion of the compartment of the vehicle;

a retracting mechanism moving the first roof panel so as to overlap the second roof panel and moving the first roof panel and the second roof panel, which overlap each other, so as to further overlap the rear window panel;

a lift mechanism moving the first roof panel, the second roof panel and the rear window panel, which overlap each other, so as to be stored within a luggage space provided at a rear portion of the vehicle;

the retracting mechanism including plural rotational link members provided among the first roof panel, the second roof panel and the rear window panel;

the rear window panel including a protruding portion formed so as to cover one of: a side surface of the second roof panel; and both a side surface of the first roof panel and the side surface of the second roof panel, while the first roof panel and the second roof panel are positioned above the compartment; and the rotational link members supported by the protruding portion of the rear window panel;

wherein the Plural rotational link members include a drive link, a driven link, a first auxiliary link and a second auxiliary link, and the drive link is provided in a manner wherein one end of the drive link is rotatably connected to the first roof panel by a first connecting member, and the other end of the drive link is rotatably connected to the protruding portion by a second connecting member, the driven link is provided in a manner wherein one end of the driven link is rotatably connected to the first auxiliary link by a third connecting member, the other end of the driven link is fixed to the second roof panel, and the driven link is rotatably connected to the drive link at a central portion thereof by a fourth connecting member, the first auxiliary link is provided in a manner wherein one end of the first auxiliary link is rotatably connected to the first roof panel by a fifth connecting member, and the other end of the first auxiliary link is rotatably connected to the one end of the driven link by the third connecting member, and the second auxiliary link is provided in a manner wherein one end of the second auxiliary link is rotatably connected to the other end of the driven link, which is fixed to the second roof panel, by a sixth connecting member, and the other end of the second auxiliary link is rotatably connected to the protruding portion of the rear window panel by a seventh connecting member.

2. The vehicle roof automatic opening/closing device according to claim 1, wherein an actuating mechanism for actuating the rotating link members is provided at the protruding portion of the rear window panel.

3. The vehicle roof automatic opening/closing device according to claim 1, wherein an actuating mechanism for actuating the rotating link members is provided at the protruding portion of the rear window panel.

4. The vehicle roof automatic opening/closing device according to claim 1, wherein, while the first roof panel and the second roof panel are positioned above the compartment, only one of break lines existing between the first roof panel, the second roof panel and the rear window panel is seen at side surface of the vehicle.

5. The vehicle roof automatic opening/closing device according to claim 1, wherein, while the first roof panel and the second roof panel are positioned above the compartment, only one of break lines existing between the first roof panel, the second roof panel and the rear window panel is seen at side surface of the vehicle.

6. The vehicle roof automatic opening/closing device according to claim 2, wherein, while the first roof panel and the second roof panel are positioned above the compartment, only one of break lines existing between the first roof panel, the second roof panel and the rear window panel is seen at side surface of the vehicle.

7. The vehicle roof automatic opening/closing device according to claim 3, wherein, while the first roof panel and the second roof panel are positioned above the compartment, only one of break lines existing between the first roof panel, the second roof panel and the rear window panel is seen at side surface of the vehicle.

8. The vehicle roof automatic opening/closing device according to claim 1, wherein the second roof panel is comprised of plural panels.

* * * * *

UNITED STATES PATENT AND TRADEMARK OFFICE
CERTIFICATE OF CORRECTION

PATENT NO. : 7,559,597 B2 Page 1 of 1
APPLICATION NO. : 11/703077
DATED : July 14, 2009
INVENTOR(S) : Keiji Mori It is certified that error appears in the above-identified patent and that said Letters Patent is hereby corrected as shown below:

Claim 1, col. 8, line 42, "Plural" should read --plural--.

Signed and Sealed this

Seventeenth Day of November, 2009

David J. Kappos
*Director of the United States Patent and Trademark Office*